Jan. 15, 1963  R. H. ORGILL  3,074,065
ABNORMAL CONDITION SEQUENCE INDICATING DEVICE
Filed Oct. 3, 1956  3 Sheets-Sheet 1

INVENTOR
ROBERT HENRY ORGILL
By Linton and Linton
ATTORNEYS

Jan. 15, 1963 R. H. ORGILL 3,074,065
ABNORMAL CONDITION SEQUENCE INDICATING DEVICE
Filed Oct. 3, 1956 3 Sheets-Sheet 3

INVENTOR
ROBERT HENRY ORGILL
By Linton and Linton
ATTORNEYS

United States Patent Office 3,074,065
Patented Jan. 15, 1963

3,074,065
ABNORMAL CONDITION SEQUENCE
INDICATING DEVICE
Robert Henry Orgill, Donovan St., Osborne Park,
Western Australia, Australia
Filed Oct. 3, 1956, Ser. No. 613,670
12 Claims. (Cl. 346—45)

This invention relates to a device for indicating the condition or failure of various components in an aircraft.

After there has been an airplane crash, there is always an extensive investigation to determine the cause of the crash. Although the evidence available to technical investigators is thoroughly checked and analyzed, it is not always sufficient to provide a clear indication of the cause of the crash. The manufacturers of aircraft take every precaution to prevent the recurrence of those conditions which investigators believe may have been responsible for the crash, but where the cause is unknown they are unable to take appropriate action.

The object of the present invention is, therefore, to provide a condition indicating device which can be used to indicate the condition of various components of the aircraft and which, if the aircraft does actually crash, provides definite recorded evidence of the causes of the crash. To this extent the device of the present invention may be regarded as a "crash evidence unit."

Broadly, the present invention provides a condition indicating device comprising a series of parallel electrical circuits each independently associated with the various components of an aircraft, means connected to each of the aircraft components or sections for actuating the corresponding electrical circuit when abnormal characteristics are exhibited by the component, and means operated by each electrical circuit for recording the abnormal condition.

Preferably the recording means are mounted in a suitable container so that in the event of a crash, the recording means are protected from damage and are readily available for inspection by investigators.

The invention will be better understood by reference to the following description of the features shown in the accompanying drawings, wherein.

Figure 4:
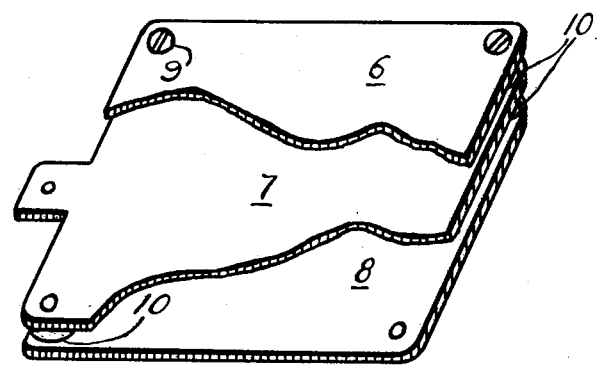
FIG. 4 is an enlarged perspective view of actuating means with portion broken away.

The means connected to each of the aircraft components for actuating the corresponding electrical circuit when abnormal conditions are present in the component may comprise a microswitch fitted to the component itself or operated by a bellows fitted to the component. One form of actuating means particularly suitable for use with the present invention and which may be used in place of or in addition to a microswitch is shown in FIG. 4 of the accompanying drawings, and comprises three plates 6, 7 and 8 of electrically conducting material secured together by screws 9 and insulated from each other and spaced apart from each other by small discs 10 of insulating material. The central plate 7 is connected to one side of the electrical circuit and the plates 6 and 8 to the other side. The actuating means are secured directly to the component or to a bellows connected to the component so that under normal conditions the movement of the component does not flex the plate 6 or 8 sufficiently to contact the plate 7. Should abnormal conditions arise, the plate 6 or 8 will flex sufficiently to contact the plate 7 and so complete the electrical circuit. If desired, the actuating means may comprise only two plates such as 6 and 7 spaced apart and insulated from each other. Alternatively the actuating means may comprise a single plate secured directly to the component but spaced apart and insulated from it. One lead of the electrical circuit is connected to the plate and the other directly to the component.

Figure 3:
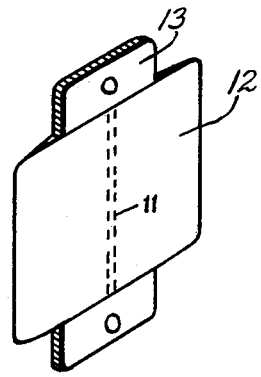
FIG. 3 is an enlarged perspective view of one form of recording means.

The recording means are preferably in the form of low resistance fuse type heater cartridges. One particularly suitable form is shown in FIG. 3 of the drawings and comprises a resistance wire 11 embedded in a small block 12 of a light colored heat discoloring material such as paper or a plastic material and provided at each end with metal terminal lugs 13. When an electric current is passed through the wire, the heat generated causes discoloration of the heat discoloring material. The degree of discoloration of the cartridges to which the components are connected is an indication of the sequence of the failure of a number of components as will be explained hereafter. If desired, the wire may be provided with a small central S bend or coiled portion to provide a greater concentration of heating effect.

Figure 2:
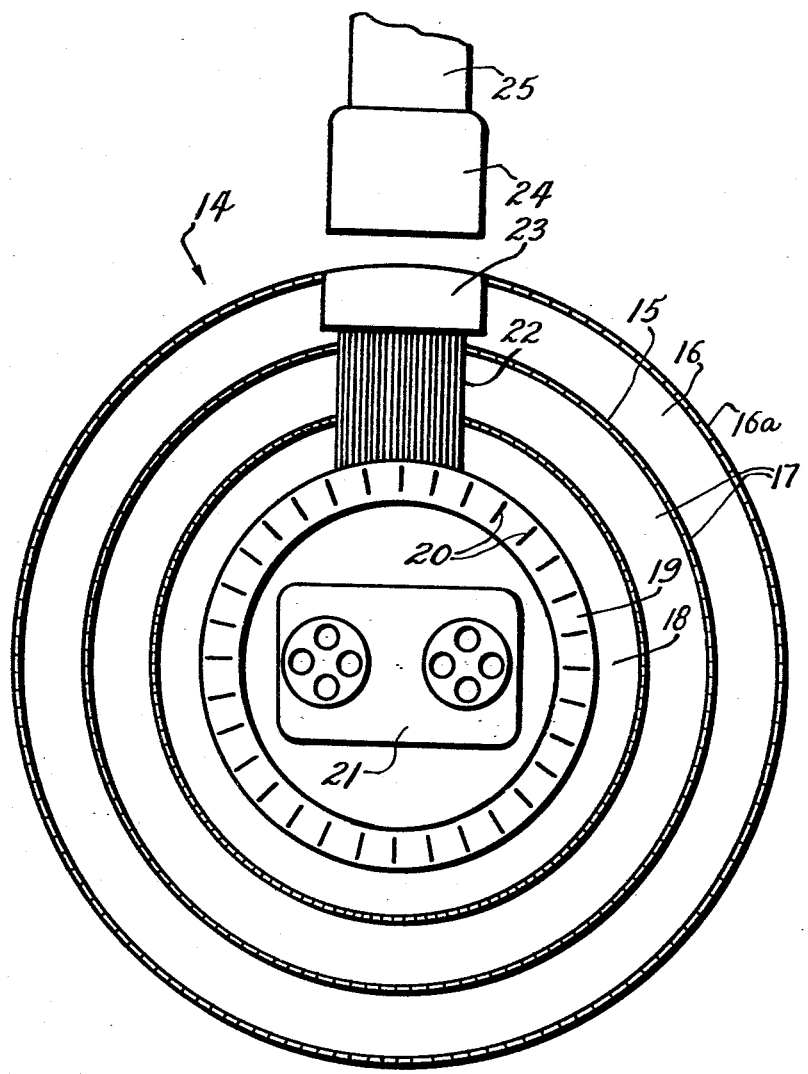
FIGURE 2 is a cross section partly diagrammatic of the housing of the recording means.

When the device of the present invention is fitted to an aircraft, the actuating means which may be of the type described above are fitted to the various vulnerable components and linked in the electrical circuit with the recording means which are preferably stored in a housing 14 in the manner shown in FIG. 2 of the drawings. The housing 14 preferably comprises a metal sphere 15 provided with an outer fireproof flexible covering, the outer portion of which is packed with alternate layers of flexible asbestos and fiber glass 17. The outer layer 16 comprises a layer of soft rubber provided with air pockets (not shown) to increase buoyancy and covered with a hard rubber skin 16a. The inner portion of the sphere is packed with sponge rubber 18 which surrounds a ring 19 of insulated material on which the recording means 20 are mounted. The recording means are provided with various markings so that the component to which they are electrically connected can be readily identified. A miniature tape recorder 21 may be mounted in the center of the sphere, if desired. The end of electrical leads 22 to and from the recording means and the tape recorder are connected to a multi-connection electrical socket 23 mounted on the periphery of the housing. The socket is adapted to receive a multi-connection plug 24 fitted at the end of a cable 25 housing the electrical leads to the actuating means fitted to the various components.

Figure 5:
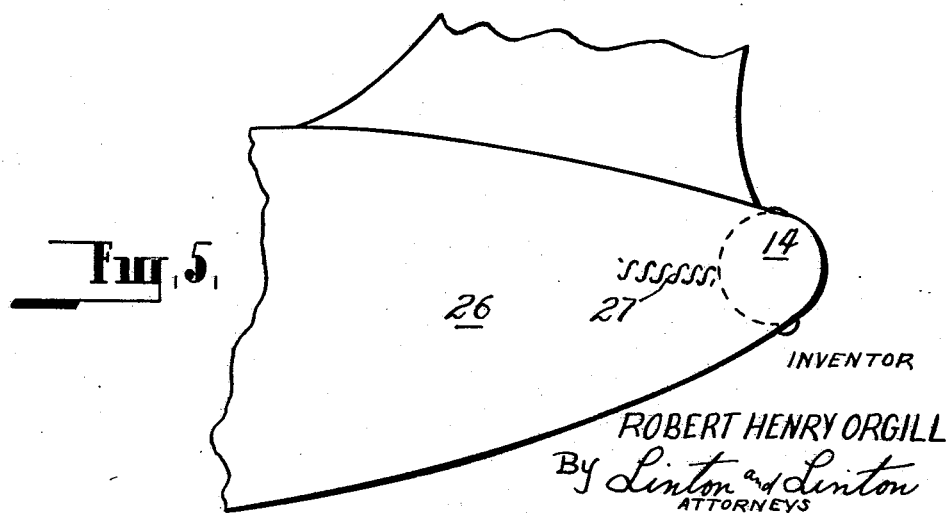
FIG. 5 is a diagrammatic view showing the mounting of the housing in the aircraft.

As shown in FIG. 5 of the drawings, the housing 14 is preferably mounted in the tail 26 of an aircraft. Preferably the housing is mounted in such a way that in the event of the aircraft crashing, a spring 27 is released to eject the housing from the aircraft, thereby obviating the possibility of the housing with its valuable recording means being destroyed. If necessary the housing may be made buoyant so that it will float on water.

Figure 1:
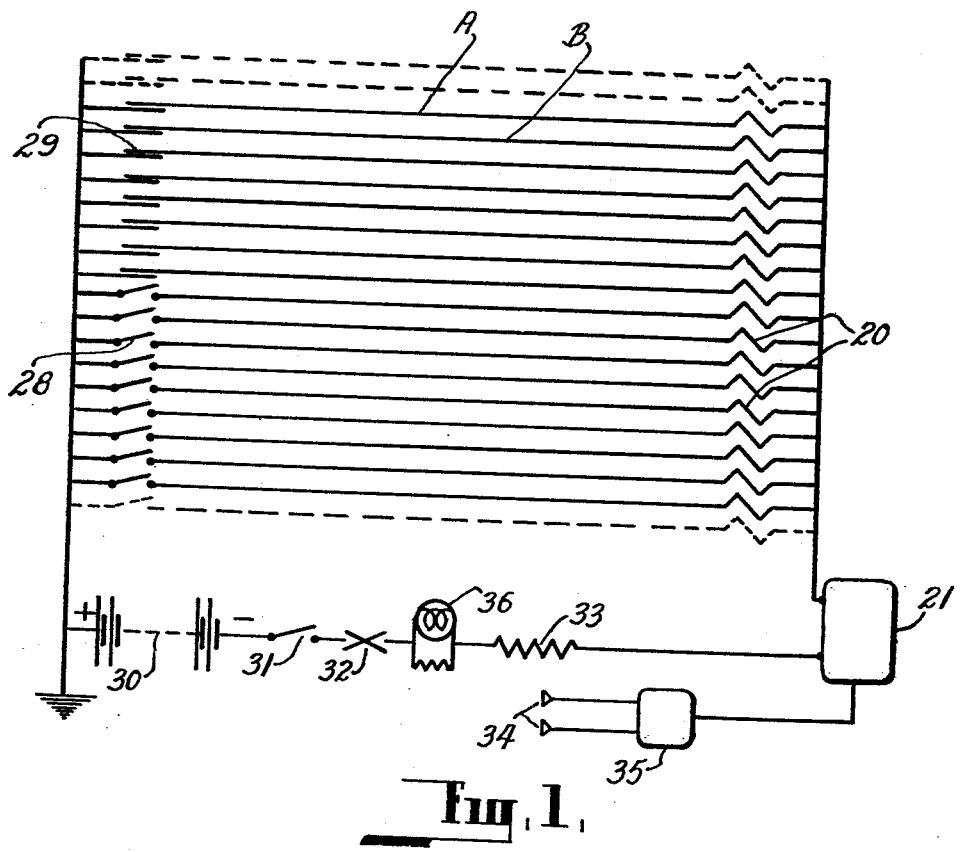
FIGURE 1 is a circuit diagram of a condition indicating device in accordance with the invention.

The wiring diagram for the device of the present invention is shown in FIG. 1 of the drawings. As shown in the diagram, the microswitches 28 or the actuating means 29 are connected in series with a battery 30 and the recording means 20. The circuit is preferably provided with a master switch 31 which may be operated manually or actuated by the Pitot tube or throttle so that the condition indicating device can be made ready for operation as desired or automatically at a predetermined speed during takeoff. A fuse 32 and a ballast resistance 33 may be placed in the circut. The fuse serves to protect the circuit of the condition indicating devices should a short circuit be caused by the aircraft crashing. The ballast resistance is adjusted electrically to suit the output of the battery. The tape recorder 21 when used is connected into the circuit and to the microphones 34 of the intercommunication system 35 and the radio transmitter of the aircraft. An indicating light 36 positioned in the pilot's cabin is also included in the circuit to provide the pilot with a visual indication that the device has been brought into operation due to abnormal conditions arising in one or more components. Various additional circuits such as those indicated by the dotted lines may be provided.

The circuits are so arranged that the sequence in which the various components produce an indication of abnormal conditions is readily apparent. Assume that the component represented by circuit A in the diagram becomes abnormal. The actuating means 29 closes the circuit and current flows through the recording means 20 which is discolored. If the component represented by circuit B then becomes abnormal, the associated recording means 20 also becomes discolored. However, as the current is now flowing through both circuits A and B, the amount which flows through each of A and B will be approximately half that which originally flowed through circuit A, and so the discoloration of the recording means associated with circuit B will be correspondingly less. This sequence indication can be emphasised by using a battery with a short ampere hour life so that the amount of current which flows will become progressively less.

If the components associated with circuits A and B should exhibit abnormal characteristics simultaneously, the current which flows through the recording means will be equal and the discoloration of the heat discoloring material will in each case be identical, thus providing conclusive evidence of the fact that both components exhibit abnormal characteristics simultaneously.

The sequence indication can be further emphasised by inserting a ballast resistance in each heater cartridge circuit to control the amperage which flows when each circuti is brought into operation.

The present invention provides a device which enables an aircraft manufacturer to detect readily any weaknesses in the various components and also means for determining the cause of a crash should one occur. The device is substantially automatic in operation and requires very little maintenance. It is relatively simple to install and occupies very little space in the aircraft. Being situated in the tail of the aircraft, the housing is less likely to be damaged or destroyed and this possibility is reduced to the absolute minimum by the provision of means for ejecting the housing in the event of a crash. The recording means may be examined after each flight. No discoloration of any of the recording means indicates that no abnormal conditions arose during the flight. If any of the recording means is discolored, the corresponding component can be minutely examined to determine if replacement or repair is necessary.

If the device is to be used under relatively cold conditions, thermostatically iontrolled heating means may be incorporated to maintain the various components at a suitable temperature.

I claim:

1. A device for indicating the presence of abnormal conditions in a plurality of components in an aircraft comprising: a plurality of parallel electrical circuits, each circuit independently associated with one of the components; means associated with each of the components to complete the corresponding electrical circuit when abnormal characteristics are exhibited by the component; means incorporated in each electrical circuit for permanently recording the presence of the abnormal conditions when current flows through the circuit; and a relatively high impedance source of electric current connected to all said electrical circuits so that the amount of current supplied to each circuit is proportional to the number of completed circuits and is indicated by the recording means.

2. A device for indicating the presence of abnormal conditions in a plurality of components in an aircraft comprising: a plurality of parallel electric circuits each independently associated with one of the components; means associated with each of the components adapted to complete the corresponding electrical circuit when abnormal characteristics are exhibited by the component; means incorporated in each electrical circuit for permanently recording the abnormal conditions when current flows through the circuit; and a source of electric current connected to all of said electrical circuits and so constructed that the amount of current supplied to each circuit is proportional to the number of completed circuits and is indicated by the recording means, the recording means being housed in a suitable container so that they are protected from damage.

3. A device for indicating the presence of abnormal conditions in a plurality of components in an aircraft comprising: a plurality of parallel electrical circuits each independently associated with one of the components; means associated with each of the components adapted to actuate the corresponding electrical circuit where abnormal characteristics are exhibited by the component; means incorporated in each electrical circuit for permanently recording the abnormal conditions when current flows through the circuit; a source of electric current adapted to provide an amount of current to each circuit proportional to the number of completed circuits and so indicated by the recording means, the recording means being housed in a hollow metal sphere packed with shock absorbing and fire resisting material.

4. A device as claimed in claim 3 wherein said sphere is mounted in the tail of the aircraft and means are provided for ejecting the housing in the event of the aircraft crashing.

5. A device for indicating the presence of abnormal conditions in a plurality of components in an aircraft comprising: a plurality of parallel electrical circuits each independently associated with one of the components; means associated with each of the components adapted to actuate the corresponding electrical circuit when abnormal characteristics are exhibited by the component; means incorporated in each electrical circuit for permanently recording the abnormal conditions when current flows through the circuit; and a source of electric current connected to said circuits and having an impedance such that the amount of electric current supplied to each circuit is proportional to the number of circuits and is indicated by the recording means, the recording means being housed in a housing to protect them from damage and the housing being provided with a multi-connection electrical socket to which the electrical leads to and from the recording means are connected, the socket being adapted to receive a multiconnection plug fitted to the end of a cable housing the electrical leads to the actuating means.

6. A device for indicating the presence of abnormal conditions in a plurality of components in an aircraft comprising: a plurality of parallel electrical circuits each independently associated with one of the components; means associated with each of the components adapted to complete the corresponding electrical circuit when abnormal characteristics are exhibited by the component; a low resistance fuse type heater cartridge incorporated in each electrical circuit for recording the abnormal condition; and a single source of electric current connected to all the electrical circuits' source of electric current so that the amount of current supplied to each circuit is proportional to the number of completed circuits and is indicated by the degree of discoloration of the cartridges.

7. A device for indicating the presence of abnormal conditions in a plurality of components in an aircraft comprising: a plurality of parallel electric circuits each normal characteristics are exhibited by the component; means associated with each of the components adapted to complete the corresponding electrical circuit when abnormal characteristics are exhibited by the component; a piece of resistance wire incorporated in each electrical circuit for recording the abnormal condition; a source of electric current connected to said circuits so that the amount of current supplied to each circuit is proportional to the number of completed circuits; and heat discoloring material adjacent each of said resistance wires, whereby the existence of a particular abnormal condition and the number of other abnormal conditions is indicated by the degree of discoloration of the heat discoloring material.

8. A device as claimed in claim 7 wherein the wire is provided with a small S bend or coiled portion.

9. A device for indicating the presence of abnormal conditions in a plurality of components in an aircraft comprising: a plurality of parallel electrical circuits each independently associated with one of the components; means associated with each of the components adapted to complete the corresponding electrical circuit when abnormal characteristics are exhibited by the component; means incorporated in each electrical circuit for permanently recording the abnormal condition; and a battery of, relatively high impedance connected to said circuits, the amount of current supplied to each circuit being proportional to the number of completed circuits and indicating on the recording means the sequence in which the circuits are completed.

10. A device for indicating the presence of abnormal conditions in a plurality of components in a vehicle comprising: a plurality of parallel electrical circuits each independently associated with one of the components; switch means associated with each of the components, adapted to actuate the corresponding electrical circuit when abnormal characteristics are exhibited by the component; means adapted to provide electrical energy, connected to said electrical circuits, said means having a relatively high impedance; and a plurality of indicator means each connected in one of said electrical circuits and adapted to indicate an abnormal condition of a corresponding one of said components, said indicator means including heater means and means adapted to be discolored by the application of heat, said indicator means and said means for providing electrical energy being so co-ordinated that the degree of discoloration of any one of said indicator means is a function of the number of said indicator means previously actuated.

11. A device as defined in claim 10 in which said indicator means are mounted in a separate container that may be ejected from said vehicle to preserve a record of said abnormal conditions.

12. An indicator of the class described which includes: a housing; a multi-conductor electrical connector mounted on said housing, adapted to be separated upon the removal of said housing from its normal location; a plurality of electrical heater elements each adapted to be energized by the completion of a circuit extending through said connector, and through an external circuit including a current source of relatively high impedance, the amount of heat developed by each of said heater elements being a function of the number of heater elements previously energized; and heat sensitive indicating means adjacent each of said heater elements, said indicating means giving a visual indication of the amount of heat developed by each of said heater elements.

References Cited in the file of this patent
UNITED STATES PATENTS

| | | |
|---|---|---|
| 1,306,631 | Rogers | June 10, 1919 |
| 1,947,816 | Waite et al. | Feb. 20, 1934 |
| 2,259,123 | Wells et al. | Oct. 14, 1941 |
| 2,313,627 | Cooper | Mar. 9, 1943 |
| 2,373,089 | Allen et al. | Apr. 10, 1945 |
| 2,473,050 | Camp | June 14, 1949 |
| 2,539,874 | Stockfleth | Jan. 30, 1951 |
| 2,639,106 | Sesera | May 19, 1953 |